United States Patent [19]
Andre

[11] Patent Number: 5,605,355
[45] Date of Patent: Feb. 25, 1997

[54] DEVICE FOR COUPLING A PIPE ON AN INSERT HAVING A ZONE OF WEAKNESS

[75] Inventor: Maxime Andre, Chateaurenard, France

[73] Assignee: Hutchinson, Paris, France

[21] Appl. No.: 554,075

[22] Filed: Nov. 6, 1995

[30] Foreign Application Priority Data

Nov. 7, 1994 [FR] France .................................. 94 13298

[51] Int. Cl.$^6$ ................................................ F16L 33/207
[52] U.S. Cl. ............................ 285/3; 24/704.1; 24/17 AP;
                                                    285/4; 285/242; 285/284
[58] Field of Search ............................. 281/3, 4, 23, 242,
                             281/256, 156, 284, 382, 381; 24/3.3, 3.4,
                                                704.1, 17 AP, 16 PB

[56] References Cited

U.S. PATENT DOCUMENTS

| | | |
|---|---|---|
| 3,185,500 | 5/1965 | Luther ........................................... 285/4 |
| 4,043,857 | 8/1977 | Byrne et al. . |
| 4,600,222 | 7/1986 | Appling . |
| 5,033,775 | 7/1991 | Matte et al. ............................. 285/156 |
| 5,125,693 | 7/1992 | Mogavero ............................... 285/156 |
| 5,320,389 | 6/1994 | Dupont, Jr. . |
| 5,335,944 | 8/1994 | Mitsui et al. ........................... 285/156 |
| 5,411,300 | 5/1995 | Mitsui ..................................... 285/156 |
| 5,460,762 | 10/1995 | Andre ...................................... 285/382 |

FOREIGN PATENT DOCUMENTS

| | | |
|---|---|---|
| 1154605 | 4/1958 | France . |
| 2195767 | 3/1974 | France . |

*Primary Examiner*—Eric K. Nicholson
*Attorney, Agent, or Firm*—Bell, Seltzer, Park & Gibson

[57] ABSTRACT

A device for coupling a pipe made of rubber or the like on an endpiece, the device comprising a part of plastics material overmolded on the end of the pipe engaged on the endpiece to compress said end radially, the part having a longitudinal slot or groove enabling it to be dismounted by being cut or broken. The invention is particularly suitable for coupling hoses in motor vehicles and household appliances.

6 Claims, 1 Drawing Sheet

5,605,355

DEVICE FOR COUPLING A PIPE ON AN INSERT HAVING A ZONE OF WEAKNESS

The invention relates to a device for coupling a pipe on an insert such as an endpiece or a tube, by means of a part which is overmolded on a portion of the pipe fitted onto the insert, and which radially clamps or compresses said portion of the pipe.

BACKGROUND OF THE INVENTION

Devices of that type are known, in particular from French patents 2 596 133 and 2 693 249, in which the overmolded part is either made of compact plastics material having a shrinkage coefficient on cooling that is greater than 1%, or else of a cellular plastics material which, on expanding, causes radial clamping or compression to be applied to the portion of pipe on which the part is overmolded. Those devices are commonly used in numerous technical fields, and in particular in the automobile industry, especially for mounting flexible hoses made of rubber, elastomer, or similar materials onto rigid tubes.

Compared with other types of coupling used in the same technical fields, such as snap-fastening couplings or systems having clamping collars, the above-specified devices have the characteristic of being undismountable, which constitutes both an advantage from the points of view of reliability and of coupling lifetime, and a disadvantage, e.g. when it is necessary to change a pipe or to dismount it for any reason whatsoever.

OBJECTS AND SUMMARY OF THE INVENTION

An object of the invention is to provide a solution that is simple, effective, and cheap to this problem by enabling the advantages of a coupling device of the overmolded type to be retained while avoiding the abovementioned drawback.

The invention thus seeks to provide a device of this type that is easily dismountable.

To this end, the invention provides a device for coupling a pipe on an insert such as an endpiece or a tube, the device comprising a part that is overmolded on a portion of the pipe engaged on the insert and that radially clamps or compresses said portion of the pipe on the insert, wherein said part includes means for breaking, tearing, or pulling off, in particular to enable the pipe to be dismounted.

Thus, when it is desired to dismount the pipe, it suffices to act on the above-specified means for breaking, tearing, or pulling off which are provided on the overmolded part, thereby enabling said part to be dismounted and thus enabling the pipe on which it was mounted to be dismounted or replaced. On reassembly, the pipe can be held in place again on the insert by conventional means, e.g. a clamping collar.

In a preferred embodiment of the invention, said overmolded part includes at least one zone of weakness.

The part is then dismounted as a result of breakage due to appropriate action on the zone of weakness.

In a particularly simple embodiment, said overmolded part comprises at least one slot or groove formed in a portion of the thickness of said part.

The slot or groove opens to the outside surface of the part and one of its faces is substantially tangential to the inside surface of the part or to the outside surface of the portion of pipe installed on the insert.

It then suffices to engage a tool, such as a screwdriver for example, into the slot or groove, and to apply a small shock to the tool so as to split the overmolded part without any risk of damaging the pipe mounted on the insert.

BRIEF DESCRIPTION OF THE DRAWINGS

The invention will be better understood and other characteristics, details and advantages thereof will appear more clearly on reading the following description given by way of example and made with reference to the accompanying drawings, in which.

MORE DETAILED DESCRIPTION

Figure 1:
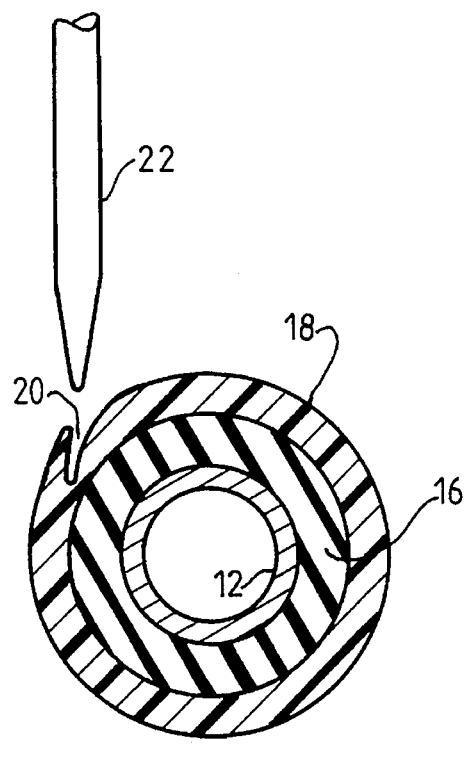
FIG. 1 is a diagrammatic cross-section view of a device of the invention.
Figure 2:
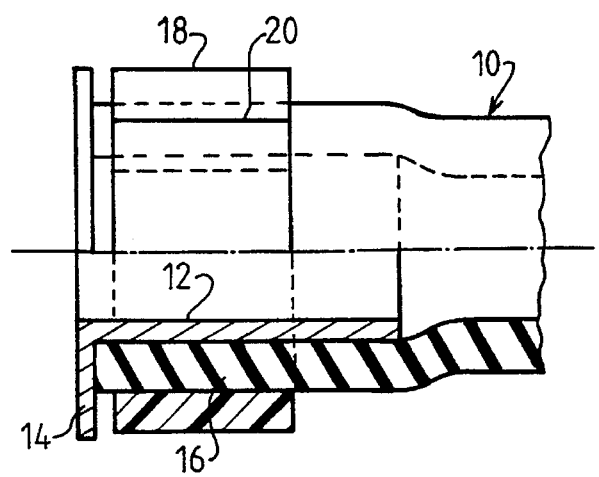
FIG. 2 is a side half-view and an axial section half-view of the device.

The device of the invention, an example of which is shown in FIGS. 1 and 2, is intended in this case for coupling a pipe 10 made of rubber or similar material onto a rigid endpiece 12 made of metal or of plastics material. The inside diameter of the rubber pipe 10 may be slightly smaller than the outside diameter of the endpiece 12, and it may be forced thereon e.g. until coming into abutment against a flange 14 on the endpiece 12. The end 16 of the pipe is held on the endpiece 12 by an overmolded part 18 which is shown here as being in the form of a cylindrical ring. This part radially clamps or compresses a portion of the end 16 of the pipe that is mounted on the endpiece 12.

As already mentioned above, the part 18 may be made of a compact plastics material that shrinks on cooling and that is overmolded while hot around the end 16 of the pipe and that compresses it radially onto the endpiece 12 on cooling down.

The part 18 could also be made of a cellular or expanded plastics material, e.g. cellular polyamide, and it is then overmolded around the end 16 of the pipe engaged on the endpiece 12 so that the cellularization or expansion of the plastics material takes place in situ, thereby exerting radial clamping or compression on the end 16 of the pipe.

Various known means may be used to improve the grip of the end 16 of the pipe on the endpiece 12: for example sawtooth ribs or corrugations may be provided on the cylindrical outside surface of the endpiece 12.

The device is difficult to dismount and requires the part 18 to be destroyed, which is difficult to do without damaging the pipe 10 and possibly also the endpiece 12, or else it is necessary to replace the entire pipe 10 and the endpiece, which can also be difficult, or even impossible in certain cases.

The invention provides a solution to this problem which is particularly simple, effective, and cheap. This is done by shaping the overmolded part 18 in such a manner as to enable it to be dismounted easily and quickly.

For example, as shown in FIGS. 1 and 2, it is possible to mold in the part 18 a longitudinal slot or groove 20 which extends parallel to the longitudinal axis of the part 18 over the entire length thereof and down to a certain depth from its outside surface so as to constitute a zone of weakness facilitating breakage of the part 18.

To break the part, as shown diagrammatically in FIG. 1, it is possible to insert the end of a screwdriver 22 into the groove 20 and to strike the other end of the screwdriver so as to perforate or split the bottom of the groove 20, thereby opening the part 18 longitudinally.

Advantageously, at least one of the two longitudinal faces of the slot or groove 20 is oriented substantially tangentially to the inside cylindrical surface of the part 18, i.e. also tangentially to the outside cylindrical surface of the end 16 of the pipe, thereby reducing or avoiding the risk of damage being inflicted on said end of the pipe while the part 18 is being opened.

The pipe 10 is easily removed from the endpiece 12 once the part 18 has been opened. Thereafter, the pipe can be re-mounted on the endpiece and can be held in place by conventional means, such as a clamping collar, for example.

Naturally, numerous different shapes may be given to the part 18 in order to facilitate dismounting thereof: for example, two adjacent slots or grooves 20 may be provided that are adjacent and that extent towards each other so as to make it possible to insert the jaws of a pair of snips in the slots and then open the part 18 by closing the jaws of the snips.

It is also possible to form two lines of weakness in the part 18 that are substantially parallel and adjacent to each other, leaving between them an elongate strip of material that can be taken hold of at one end by a pair of pliers and then pulled out along the entire length of the part 18.

In general, it suffices to provide the part 18 with means for breaking, tearing, or pulling off to enable said piece to be dismounted easily and quickly, in a few seconds at most, by using an appropriate tool.

It is clear the invention applies to numerous technical fields such as motor vehicles, household appliances, etc., in particular for coupling or connecting pipes made of plastics material, of rubber, or of elastomer onto endpieces, tubes, ducts, etc.

I claim:

1. A device for coupling a flexible pipe on a rigid tubular insert, the device comprising a tubular part of molded plastics material which surrounds a portion of the pipe engaged on the insert and which radially clamps said portion of the pipe on the insert, said tubular part including at least one zone of weakness configured to permit breaking or tearing of said tubular part to enable the pipe to be dismounted from the insert, said zone of weakness including at least one face that is substantially tangent to the inside surface of said tubular part configured to form a guide for a tool permitting the breaking or tearing of said tubular part without damage to said portion of the pipe.

2. A device according to claim 1, wherein said zone of weakness is formed over at least a portion of the length of the tubular part.

3. A device according to claim 1, wherein said zone of weakness extends longitudinally along the tubular part.

4. A device according to claim 1, wherein the zone of weakness includes at least one slot or groove formed through a portion of the thickness of the tubular part.

5. A device according to claim 4, wherein the slot or groove is open to the outside surface of the tubular part.

6. A device according to claim 1, wherein the molded tubular part is made of a compact plastics material having a coefficient of shrinkage on cooling or out of a cellular or expanded plastics material.

\* \* \* \* \*